United States Patent
Ohashi et al.

(10) Patent No.: US 12,516,713 B2
(45) Date of Patent: Jan. 6, 2026

(54) BALANCER DEVICE

(71) Applicant: FANUC CORPORATION, Yamanashi (JP)

(72) Inventors: Toshinori Ohashi, Yamanashi (JP); Masakazu Furuta, Yamanashi (JP); Hiroshi Nakagawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 396 days.

(21) Appl. No.: 18/026,750

(22) PCT Filed: Sep. 24, 2021

(86) PCT No.: PCT/JP2021/034920
§ 371 (c)(1),
(2) Date: Mar. 16, 2023

(87) PCT Pub. No.: WO2022/071074
PCT Pub. Date: Apr. 7, 2022

(65) Prior Publication Data
US 2023/0341025 A1    Oct. 26, 2023

(30) Foreign Application Priority Data

Sep. 29, 2020 (JP) ................................. 2020-163444
Feb. 19, 2021 (JP) ................................. 2021-024990

(51) Int. Cl.
*F16F 13/00* (2006.01)
*B25J 19/00* (2006.01)
*F16F 7/12* (2006.01)

(52) U.S. Cl.
CPC ......... *F16F 13/005* (2013.01); *B25J 19/0008* (2013.01); *F16F 7/12* (2013.01); *F16M 2200/044* (2013.01)

(58) Field of Classification Search
None
See application file for complete search history.

(56) References Cited

U.S. PATENT DOCUMENTS 1,661,182 A * 3/1928 Junkers ................... B64C 25/60
                                                267/221
2,123,388 A * 7/1938 Viguerie, Jr. .......... B60G 11/14
                                                301/133

(Continued)

FOREIGN PATENT DOCUMENTS

CN    203171650 U    9/2013
CN    204512275 U    7/2015

(Continued)

OTHER PUBLICATIONS

International Search Report dated Nov. 30, 2021, for International Patent Application No. PCT/JP2021/034920.

(Continued)

*Primary Examiner* — Melanie Torres Williams
(74) *Attorney, Agent, or Firm* — KARCESKI IP LAW, PLLC

(57) ABSTRACT

A balancer device includes a housing including a tubular body section and also including a front end plate and a rear end plate that block opposite ends of the body section in a direction of an axis; a rod that extends through the front end plate in a thickness direction thereof and that is supported such as to be movable in the direction of the axis; a movable member that is fixed to the rod and that is accommodated within the housing; a compression coil spring that is disposed between the movable member and the rear end plate; and a coupling member that couples the rod and the rear end plate to each other with play that is larger than a stroke of the rod in the direction of the axis.

11 Claims, 13 Drawing Sheets

(56) References Cited

U.S. PATENT DOCUMENTS

| | | | | | |
|---|---|---|---|---|---|
| 4,310,149 | A | * | 1/1982 | Camilleri | F16F 1/128 |
| | | | | | 188/380 |
| 8,403,308 | B2 | * | 3/2013 | Costello | E05F 1/1075 |
| | | | | | 267/69 |
| 2001/0022112 | A1 | * | 9/2001 | Bayer | B25J 19/0016 |
| | | | | | 74/490.01 |

FOREIGN PATENT DOCUMENTS

| | | |
|---|---|---|
| CN | 204961658 U | 1/2016 |
| CN | 109986598 A | 7/2019 |
| CN | 110877308 A | 3/2020 |
| JP | S573373 U | 1/1982 |
| JP | S6094490 U | 6/1985 |
| JP | H04098590 | 8/1992 |
| JP | H0519543 A | 1/1993 |
| JP | 2001225293 A | 8/2001 |
| JP | 2003516240 A | 5/2003 |
| JP | 2016191421 A | 11/2016 |
| JP | 2018068053 A | 4/2018 |
| JP | 2019188513 A | 10/2019 |
| WO | 0141978 A1 | 6/2001 |

OTHER PUBLICATIONS

Chinese Notice of Allowance dated Jul. 31, 2025, for Chinese Patent Application No. 202180065273.2.
Shu Qilin, et al., "Research on Parameters of Industrial Robot Balancing Cylinder," Tool Engineering, 2014, vol. 48, No. 12, pp. 47-50, ChengduTool Research Institute Co., Ltd.,Chengdu, China (Dec. 20, 2014).

* cited by examiner

BALANCER DEVICE

CROSS-REFERENCE TO RELATED APPLICATION(S)

This is a National Stage Entry into the United States Patent and Trademark Office from International Patent Application No. PCT/JP2021/034920, filed on Sep. 24, 2021, which relies on and claims priority to Japanese Patent Application No. 2020-163444, filed on Sep. 29, 2020, and Japanese Patent Application No. 2021-024990, filed on Feb. 19, 2021, the entire contents of all of which are incorporated herein by reference.

FIELD OF THE INVENTION

The present disclosure relates to balancer devices.

BACKGROUND OF THE INVENTION

A known robot gravity balancer applies a force in a direction for pushing a rod outward from a housing by using a compression coil spring within the housing, so as to reduce a gravity-induced load moment acting on a first arm of a robot (for example, see Japanese Unexamined Patent Application, Publication No. 2019-188513).

SUMMARY OF THE INVENTION

As aspect of the present disclosure provides a balancer device including: a housing including a tubular body section and also including a front end plate and a rear end plate that block opposite ends of the body section in an axial direction; a rod that extends through the front end plate in a thickness direction thereof and that is supported such as to be movable in the axial direction; a movable member that is fixed to the rod and that is accommodated within the housing; a compression coil spring that is disposed between the movable member and the rear end plate; and a coupling member that couples the rod and the rear end plate to each other with play that is larger than a stroke of the rod in the axial direction.

DESCRIPTION OF EMBODIMENT(S) OF THE INVENTION

A balancer device 100 according to a first embodiment of the present disclosure will be described below with reference to the drawings.

Figure 1:
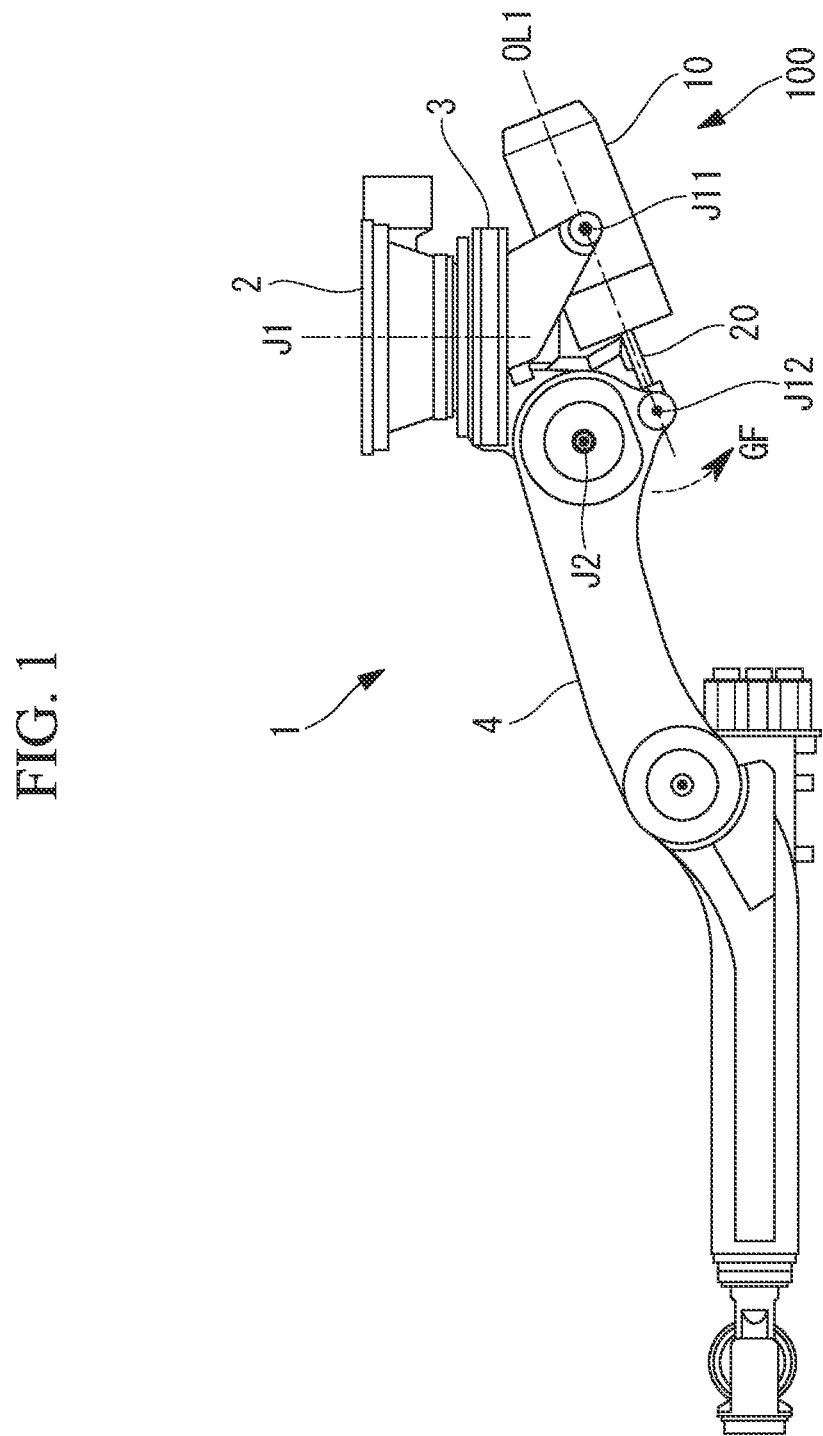
FIG. 1 is a side view schematically illustrating a ceiling-hung robot equipped with a balancer device according to a first embodiment of the present disclosure.

As shown in FIG. 1, the balancer device 100 according to this embodiment is attached to, for example, a ceiling-hung robot 1 installed in a state where it hangs down from the ceiling.

The ceiling-hung robot 1 includes a base 2 set on the ceiling, a swivel body 3 supported in such a manner as to be rotatable relative to the base 2 around a first axis J1 extending in the vertical direction, and an arm 4 supported in such a manner as to be rotatable relative to the swivel body 3 around a second axis J2 extending in the horizontal direction. The balancer device 100 is disposed between the swivel body 3 and the arm 4.

Figure 2:
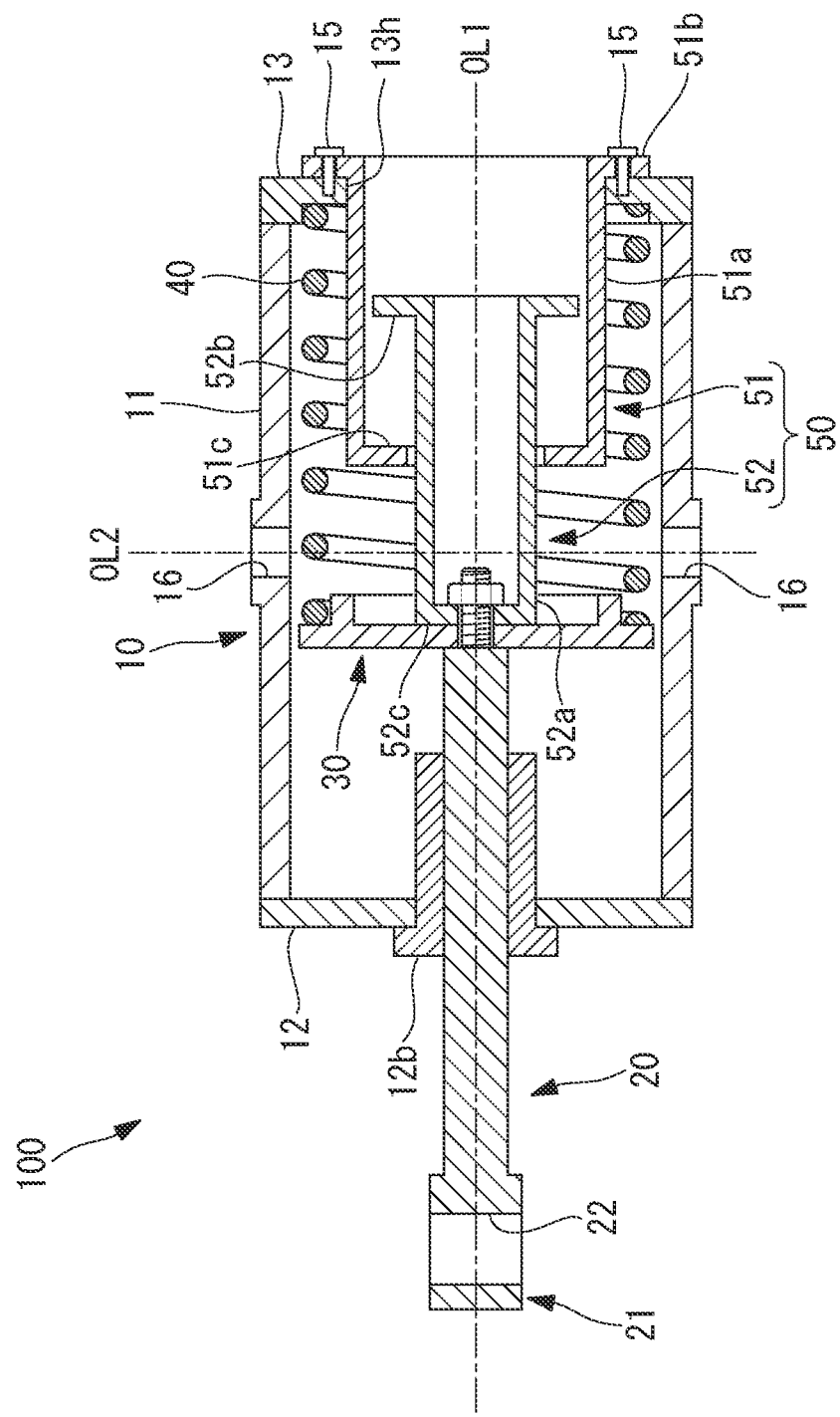
FIG. 2 is a vertical sectional view illustrating the balancer device shown in FIG. 1.

As shown in FIG. 2, the balancer device 100 includes a housing 10, a rod 20, a movable member 30, a compression coil spring 40, and a coupling member 50.

The housing 10 includes a cylindrical body section 11, and also includes a tabular front end plate 12 and a tabular rear end plate 13 that respectively block opposite ends of the body section 11 in the direction of a center axis (axis) OL1 thereof.

The front end plate 12 and the rear end plate 13 are fixed to the body section 11 by using, for example, bolts (not shown). One of the front end plate 12 and the rear end plate 13 may be integrated with the body section 11. A through-hole extends in the thickness direction through the center of the front end plate 12. A through-hole 13h extends in the thickness direction through the center of the rear end plate 13. The through-hole 13h is surrounded by a plurality of threaded holes.

The rod 20 is supported in such a manner as to be movable relative to the housing 10 along the center axis OL1 by a bearing 12b disposed in the through-hole provided in the front end plate 12. Instead of being a separate component from the front end plate 12, the bearing 12b may be integrated with the front end plate 12. A mounting block 21 for mounting the rod 20 to the arm 4 is fixed to one end of the rod 20 disposed outside the housing 10.

The movable member 30 is fixed to the other end of the rod 20 disposed inside the housing 10. The movable member 30 has the shape of a disk with an outer diameter slightly smaller than the inner diameter of the body section 11 of the housing 10, and is fixed to the other end of the rod 20 by, for example, fastening a nut to a male thread formed at the other end of the rod 20.

The compression coil spring 40 is accommodated within the body section 11 of the housing 10 and is disposed in a compressed state between the rear end plate 13 and the movable member 30. Accordingly, the movable member 30 is constantly pressed toward the front end plate 12 by a resilient force of the compression coil spring 40, and pushes the rod 20 outward of the housing 10.

Figure 3:
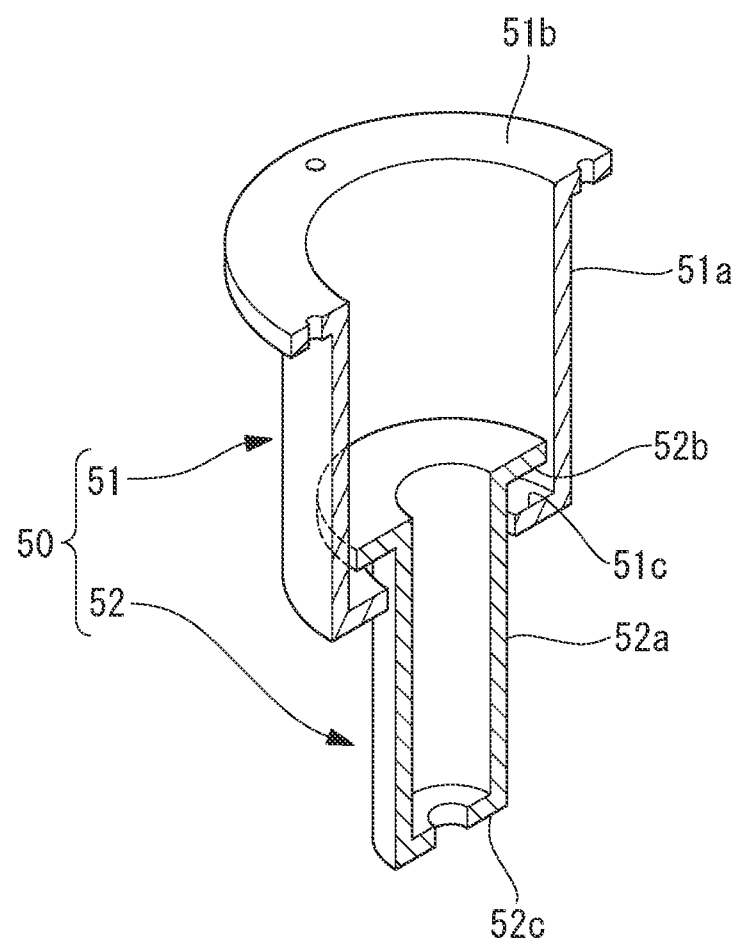
FIG. 3 is a perspective view illustrating a vertical section of a coupling member of the balancer device shown in FIG. 1.

As shown in FIGS. 2 and 3, the coupling member 50 includes a first coupling piece (first member) 51 fixed to the rear end plate 13 and a second coupling piece (second member) 52 fixed to the movable member 30.

The first coupling piece 51 includes a cylindrical main body 51a having an outer diameter smaller than the inner diameter of the through-hole 13h in the rear end plate 13 and a flanged mounting seat surface 51b that protrudes radially outward from the outer peripheral surface at one end of the main body 51a and that has an outer diameter larger than the inner diameter of the through-hole 13h. The first coupling piece 51 also includes a flanged stopper 51c protruding radially inward from the inner peripheral surface at the other end of the main body 51a.

The mounting seat surface 51b is provided with a plurality of through-holes extending through the main body 51a in the axial direction thereof. In a state where the main body 51a is fitted in the through-hole 13h in the rear end plate 13 from the outside, bolts 15 extending through the through-holes in the mounting seat surface 51b are fastened to threaded holes in the rear end plate 13, so that the first coupling piece 51 is fixed to the rear end plate 13.

The second coupling piece 52 includes a cylindrical main body 52a having an outer diameter that allows it to extend through the radially-inner side of the stopper 51c, and a flanged abutment section (abutment surface) 52b having a diameter larger than the inner diameter of the stopper 51c and protruding radially outward from the outer peripheral surface at one end of the main body 52a. The second coupling piece 52 also includes a flanged base plate 52c protruding radially inward from the inner peripheral surface at the other end of the main body 52a. The base plate 52c is provided with a through-hole that extends through the main body 52a in the axial direction thereof and through which the male thread of the rod 20 is extendable.

The second coupling piece 52 is fixed together with the movable member 30 to the rod 20 by inserting the male thread of the rod 20 into the through-hole in the base plate 52c and fastening the nut to the male thread of the rod 20.

The position of the rod 20 relative to the housing 10 is changed in accordance with the rotational angle of the arm 4 relative to the swivel body 3. In this case, the positional relationship between the abutment section 52b of the second coupling piece 52 and the stopper 51c of the first coupling piece 51 is maintained such that the abutment section 52b and the stopper 51c are disposed with a gap therebetween without coming into contact with each other within the full stroke range of the rod 20 corresponding to the operating range of the arm 4.

Specifically, the coupling member 50 couples the movable member 30 and the rear end plate 13 to each other with play that is larger than the stroke of the rod 20 in the direction of the center axis OL1.

The body section 11 of the housing 10 is provided with a pair of first mounting holes 16 that are located radially opposite each other at intermediate locations in the direction of the center axis OL1 and that extend along an orthogonal axis OL2 orthogonal to the center axis OL1. A pair of first shafts (not shown) fixed to the swivel body 3 are fitted in the respective first mounting holes 16. The first shafts are disposed on the same line extending along a first mounting axis J11 that is parallel to the second axis J2.

Accordingly, the housing 10 is mounted to the swivel body 3 in such a manner as to be rotatable around the first mounting axis J11.

The mounting block 21 is provided with a second mounting hole 22 extending orthogonally to the center axis OL1. A second shaft (not shown) fixed to the arm 4 is fitted into the second mounting hole 22. The second shaft extends along a second mounting axis J12 that is parallel to the second axis J2. Accordingly, the distal end of the rod 20 is attached to the arm 4 in such a manner as to be rotatable around the second mounting axis J12.

The operation of the balancer device 100 according to this embodiment having the above-described configuration will be described below.

For example, as shown in FIG. 1, in the ceiling-hung robot 1 to which the balancer device 100 according to this embodiment is attached, when the arm 4 is extended forward, the arm 4 receives a gravitational load moment around the second axis J2 in the direction of GF due to gravity.

On the other hand, the balancer device 100 pushes the rod 20 outward of the housing 10 in accordance with the resilient force of the compression coil spring 40. Since this force acts on the second mounting axis J12 decentered from the second axis J2, auxiliary torque is generated against the gravitational load moment.

In this case, the amount of compression of the compression coil spring 40 provided in the balancer device 100 is the smallest when the arm 4 extends forward, as shown in FIG. 1, and when the arm 4 extends rearward, and is the largest when the arm 4 extends downward. In order to generate sufficient auxiliary torque at the positions where the amount of compression is the smallest, the compression coil spring 40 has an extremely large spring constant. Therefore, the rear end plate 13 is constantly pushed rearward by the large resilient force of the compression coil spring 40.

Accordingly, for example, if breakage occurs between the body section 11 and the rear end plate 13 of the housing 10 for a certain reason, such as deterioration caused by a long period of operation, the rear end plate 13 may pop out rearward.

Figure 4:
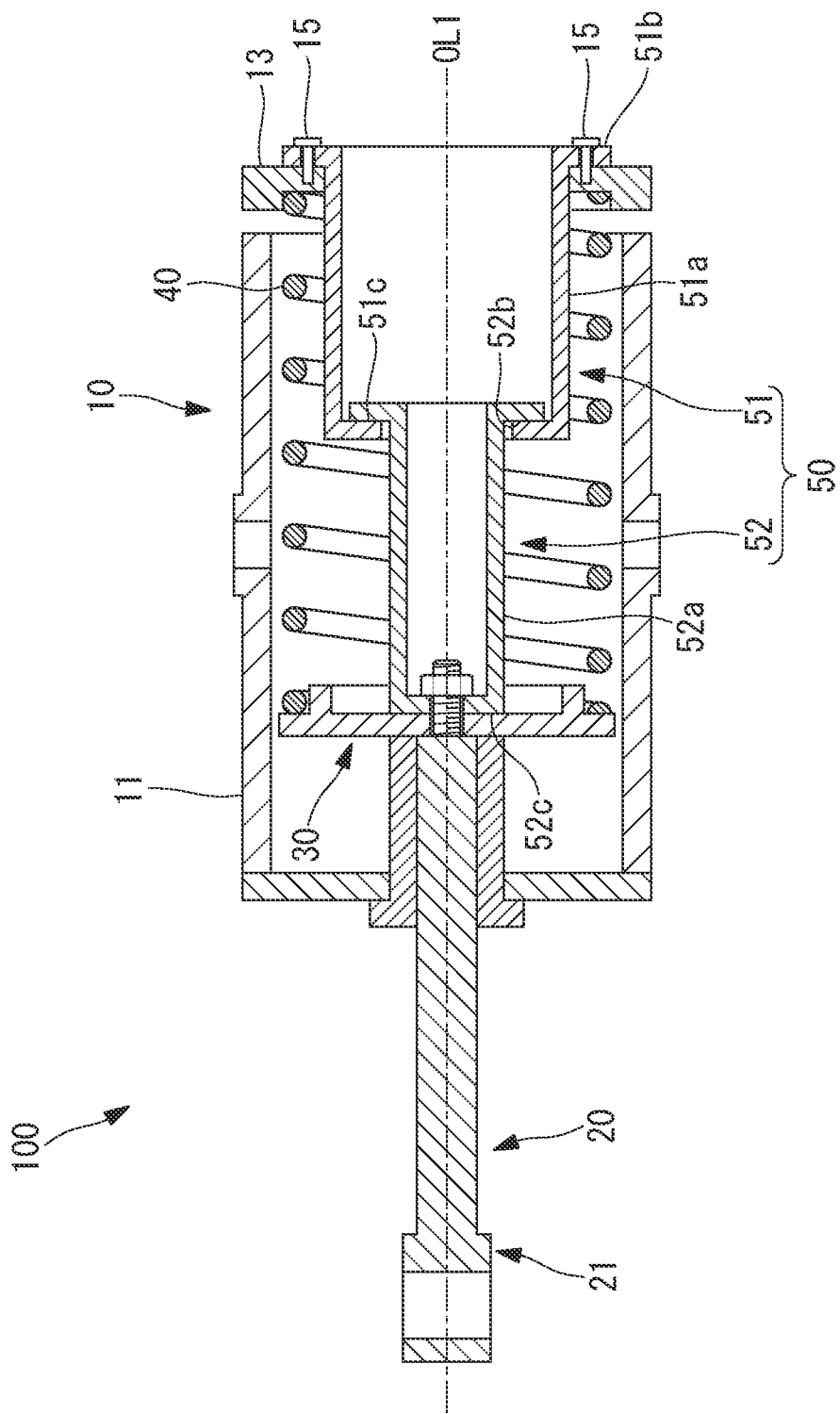
FIG. 4 is a vertical sectional view illustrating a state where a rear end plate is separated from a body section of the balancer device shown in FIG. 1.

In this case, as shown in FIG. 4, the distance between the rear end plate 13 and the movable member 30 increases, so that the stopper 51c and the abutment section 52b come into abutment with each other, whereby any further rearward movement of the rear end plate 13 is regulated. Consequently, the rear end plate 13 can be prevented from popping out rearward.

Furthermore, since the first coupling piece 51 and the second coupling piece 52 do not come into contact with each other during operation, the first coupling piece 51 and the second coupling piece 52 do not receive the large resilient force of the compression coil spring 40, so that stress-induced fatigue is not accumulated even after a long period of operation.

Accordingly, the first coupling piece 51 and the second coupling piece 52 are less likely to deteriorate than the housing 10 that constantly receives the resilient force of the compression coil spring 40, so that even if the housing 10 breaks due to deterioration, the rear end plate 13 can be reliably prevented from popping out.

Furthermore, in this embodiment, the stopper 51c is disposed closer to the movable member 30 than the rear end plate 13 by utilizing the space inside the compression coil spring 40, so that the abutment section 52b can also be disposed closer to the movable member 30 accordingly.

Specifically, since the abutment section 52b is closer to the base plate 52c, this is advantageous in that the dimension of the second coupling piece 52 in the axial direction thereof can be reduced.

Furthermore, the main body 51*a* of the first coupling piece 51 has a tubular shape and accommodates the abutment section 52*b* therein. This is advantageous in that the dimension, in the radial direction, of the second coupling piece 52 equipped with the abutment section 52*b* can be reduced.

Furthermore, in addition to the main body 51*a*, the main body 52*a* also has a tubular shape in this embodiment, so that the through-hole provided in the base plate 52*c* can be visually recognized from outside the rear end plate 13. Consequently, the male thread of the rod 20 extending through the through-hole in the base plate 52*c* and the nut fastened to the male thread are readily accessible from the outside.

Specifically, the coupling member 50 can be detached from outside the housing 10, thereby enhancing the workability of the assembly process and the disassembly process of the balancer device 100.

Figure 5:
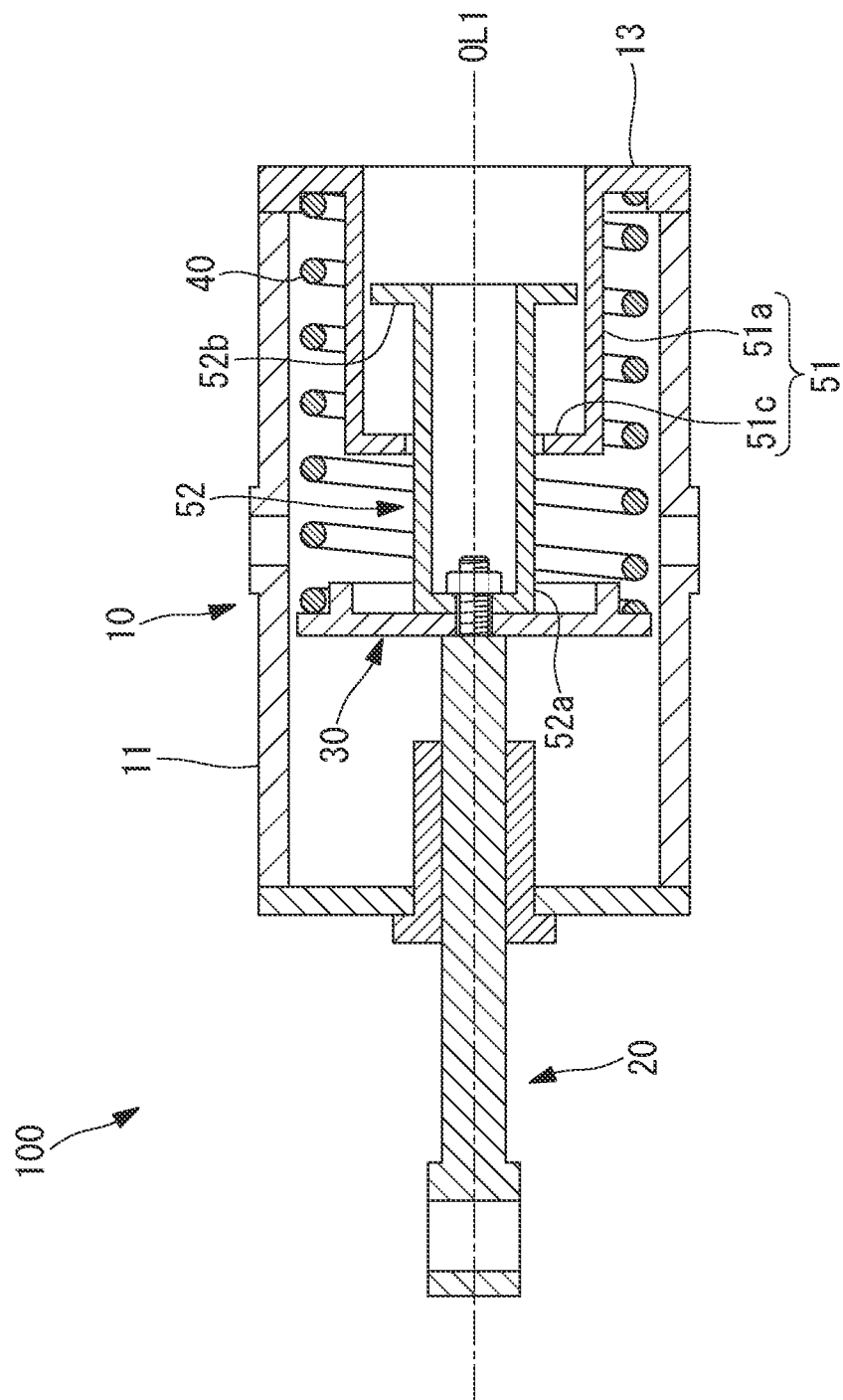
FIG. 5 is a vertical sectional view illustrating a first modification of the balancer device shown in FIG. 1.

As an alternative to this embodiment in which the first coupling piece 51 provided with the stopper 51*c* is a separate component from the rear end plate 13 and is fixed to the rear end plate 13 by using the bolts 15, the first coupling piece 51 may be integrated with the rear end plate 13, as shown in FIG. 5.

In this case, the bolts 15 used for fixing the first coupling piece 51 to the rear end plate 13 are not necessary, so that the number of components and the number of assembly steps can be reduced.

Figure 6:
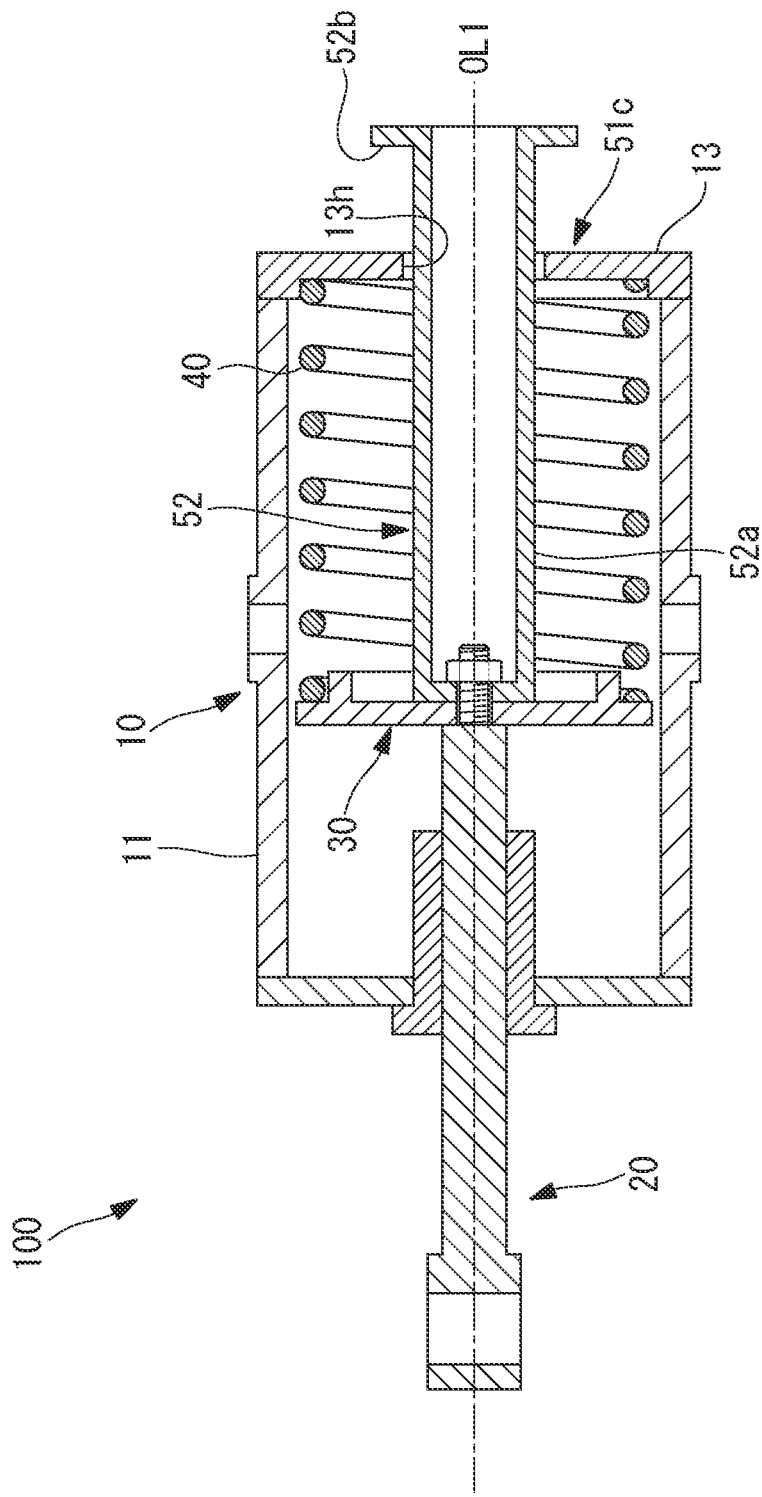
FIG. 6 is a vertical sectional view illustrating a second modification of the balancer device shown in FIG. 1.

Furthermore, as shown in FIG. 6, a peripheral edge of the through-hole 13*h* in the rear end plate 13 may serve as the stopper 51*c*.

In this case, the abutment section 52*b* may have an outer diameter larger than the inner diameter of the through-hole 13*h* in the rear end plate 13, and the second coupling piece 52 may be fixed to the movable member 30 in a state where the main body 52*a* is fitted in the through-hole 13*h* from the outside. Accordingly, the rear end plate 13 can have a simpler shape.

As an alternative to this embodiment in which the main body 52*a* of the second coupling piece 52 is cylindrical, the main body 52*a* may be rod-like.

This is advantageous in that the second coupling piece 52 can have a simpler structure.

Furthermore, in this embodiment, the coupling member 50 may be formed of a flexible wiring member, such as a metal wire.

Figure 7:
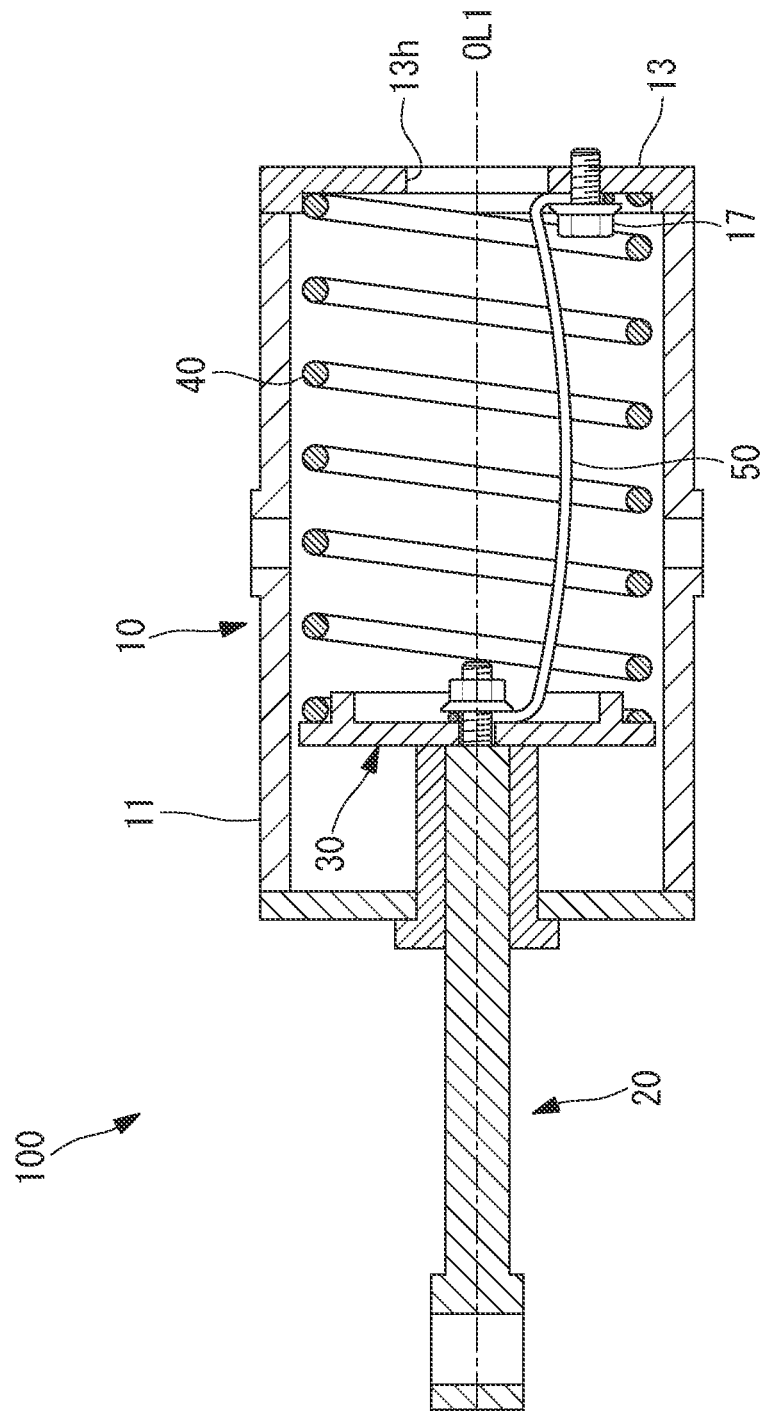
FIG. 7 is a vertical sectional view illustrating a third modification of the balancer device shown in FIG. 1.

In this case, for example, as shown in FIG. 7, one end of the coupling member 50 is loop-shaped, and a bolt 17 extending through the loop is fastened to the rear end plate 13, so that the one end of the coupling member 50 is fixed between the bolt head of the bolt 17 and the rear end plate 13. Likewise, the other end of the coupling member 50 is fixed to the movable member 30, and the length of a portion of the coupling member 50 bridged between the rear end plate 13 and the movable member 30 is set to be slightly larger than the maximum stroke of the rod 20.

Accordingly, although the coupling member 50 extends loosely within the full stroke range of the rod 20, the coupling member 50 is stretched out without any looseness when the housing 10 is separated and the distance between the rear end plate 13 and the movable member 30 increases, whereby rearward movement of the rear end plate 13 is regulated.

Accordingly, the balancer device 100 can have a simpler structure, while the rear end plate 13 can be prevented from popping out rearward. Moreover, in a state where the housing 10 is not separated, the coupling member 50 can be bent freely. This is advantageous in that the coupling member 50 can be accommodated within the housing 10 by efficiently utilizing the space therein, and that the housing 10 can be reduced in size.

Although this embodiment relates to a case where breakage occurs between the body section 11 and the rear end plate 13 of the housing 10, the embodiment is not limited to this. The rear end plate 13 can be prevented from popping out regardless of the breakage location of the housing 10.

Next, a balancer device 200 according to a second embodiment of the present disclosure will be described below with reference to the drawings. In the description of this embodiment, components identical to those in the balancer device 100 according to the first embodiment will be given the same reference signs, and descriptions thereof will be omitted.

Figure 8:
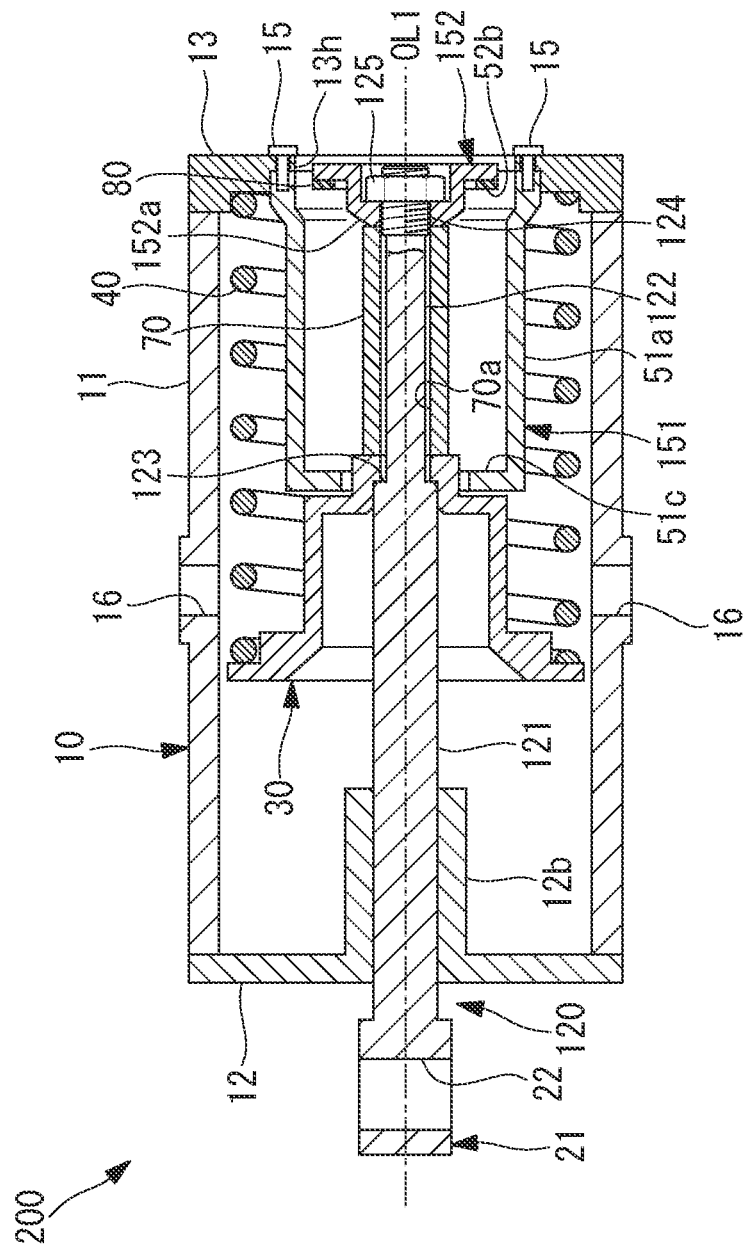
FIG. 8 is a vertical sectional view of a balancer device according to a second embodiment of the present disclosure and illustrates a compression coil spring in a maximally compressed state.
Figure 9:
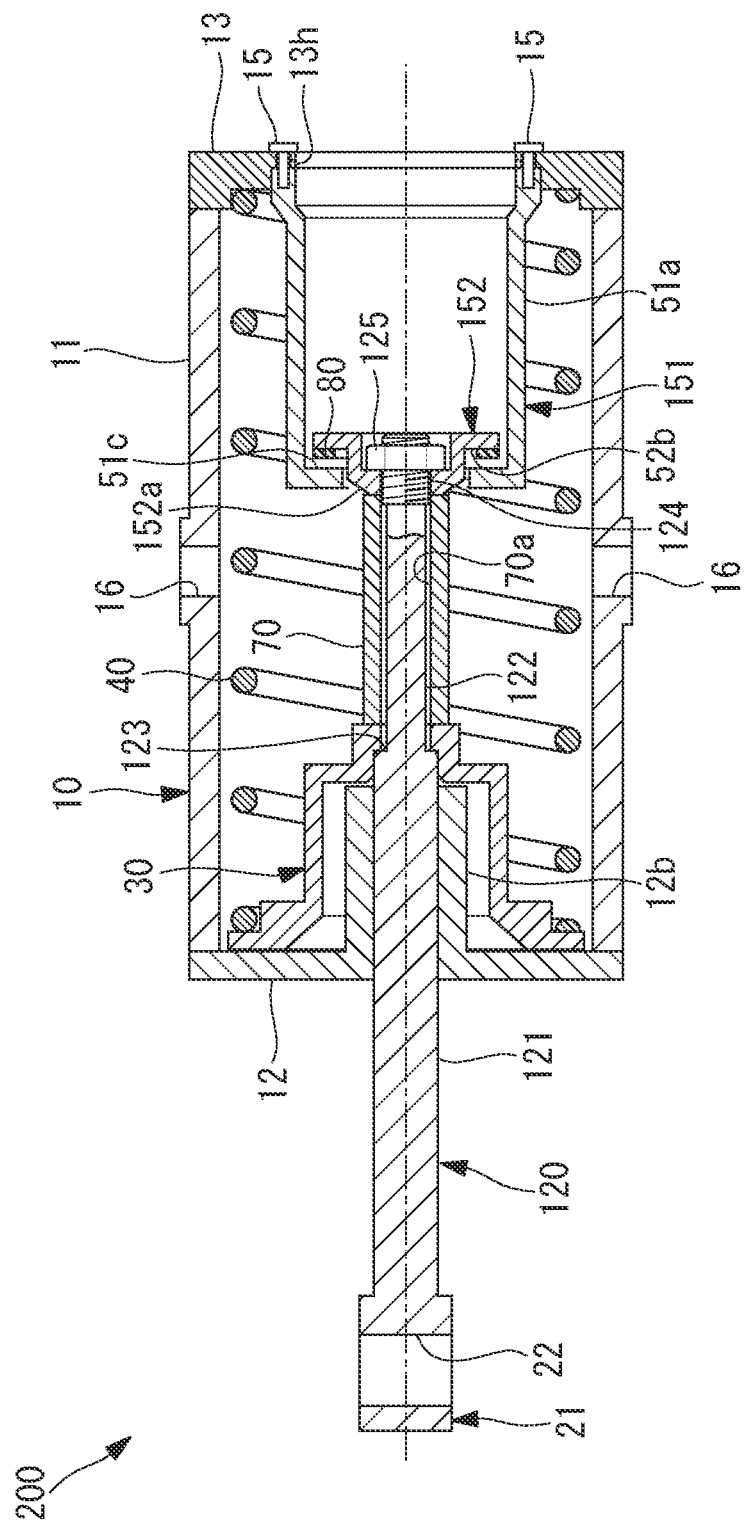
FIG. 9 is a vertical sectional view of the balancer device in FIG. 8 and illustrates the compression coil spring in a maximally extended state.

In the balancer device 100 according to the first embodiment, in order to ensure play between the abutment section 52*b* of the second member 52 and the stopper 51*c* of the first member 51, the second member 52 is made narrow, and the abutment section 52*b* is disposed at a position located away from the movable member 30 in the direction of the center axis OL1. In contrast, as shown in FIG. 8, in the balancer device 200 according to this embodiment, a second member 152 is made short in the direction of the center axis OL1, and a rod 120 is made long to have a length equal to the length of the housing 10 in the direction of the center axis OL1. Accordingly, as shown in FIG. 9, even in a state where the rod 120 protrudes by a maximum amount from the front end plate 12, play between the abutment section 52*b* of the second member 152 and the stopper 51*c* of a first member 151 is ensured.

Similar to the balancer device 100 according to the first embodiment, the rod 120 includes a rod body 121 that has a first outer diameter and that engages with the bearing 12*b*, and also includes a small-diameter section (shock-absorbing section) 122 that has a second outer diameter smaller than that of the rod body 121 and that is disposed toward the rear end plate 13 relative to the rod body 121. A step 123 with which the surface of the movable member 30 on the front-end-plate 12 side is brought into abutment is provided between the rod body 121 and the small-diameter section 122, and a male threaded section (threaded section) 124 to which a nut (fastening member) 125 is fastenable is provided toward the rear end plate 13 relative to the small-diameter section 122. Similar to the first embodiment, the movable member 30 and the second member 152 are fixed by being interposed between the nut 125 fastened to the male threaded section 124 and the step 123.

In the balancer device 200 according to this embodiment, the small-diameter section 122 has a length that is sufficiently larger than that in the balancer device 100 according to the first embodiment and that is equal to the length of the first member 151 in the direction of the center axis OL1. A tubular spacer 70 provided with a through-hole 70*a* that causes the small-diameter section 122 to extend through an inner hole is interposed between the movable member 30 and the second member 152.

In this embodiment, the rod 120 and the second member 152 are composed of carbon steel, and the first member 151 is composed of cast metal. The small-diameter section 122 is a section of the rod 120 with the smallest diameter, and has a cross-sectional area smaller than the minimum cross-sectional area of the first member 151 and the minimum cross-sectional area of the second member 152. Furthermore, the diameter of the small-diameter section 122 is set to a dimension that allows the small-diameter section 122 to be elastically deformable or plastically deformable in the lengthwise direction without breaking even when a maximum impact force is applied thereto assuming that the stopper 51c of the first member 151 and the abutment section 52b of the second member 152 collide against each other as a result of the rear end plate 13 and the body section 11 being separated from each other.

The outer peripheral edge of the end surface at the front-end-plate 12 side of the second member 152 is provided with a tapered surface 152a that is disposed radially outward of the outer peripheral surface of the spacer 70 and that tapers toward the front end plate 12. A ring-shaped rubber plate (damper) 80 is fixed to the abutment section 52b, which is ring-shaped, of the second member 152.

The operation of the balancer device 200 according to this embodiment having the above-described configuration will be described below.

In the balancer device 200 according to this embodiment, in a case where the rear end plate 13 and the body section 11 become separated from each other, the stopper 51c of the first member 151 and the abutment section 52b of the second member 152 collide against each other, so that the rear end plate 13 is prevented from popping out rearward. In this case, although the impact force generated from the collision is received by the rod 120, the first member 151, and the second member 152, the small-diameter section 122 of the rod 120 having a cross-sectional area smaller than the other sections deforms by the largest amount.

According to this embodiment, the small-diameter section 122 is made sufficiently long, so that the impact energy is absorbed by the small-diameter section 122 deforming in the direction of the center axis OL1. Specifically, with the increased length of the small-diameter section 122, a large permissible amount of distortion can be ensured without breakage. This is advantageous in that the large impact energy can be absorbed accordingly.

Furthermore, in this embodiment, the rod 120 is made long, and the spacer 70 is disposed, so that the second member 152 can be made more compact than in the first embodiment. Since the second member 152 is to collide against the first member 151, the second member 152 is composed of an expensive material with high ductility. On the other hand, the spacer 70 does not particularly require strength and can thus be composed of an inexpensive material. Therefore, the second member 152 being made compact is advantageous in that the material and machining costs can be reduced.

If the outer diameter of the spacer 70 is reduced to achieve weight reduction of the spacer 70, the amount by which the second member 152 protrudes radially outward relative to the outer peripheral surface of the spacer 70 increases. However, with the tapered surface 152a provided, the stopper 51c moves along the tapered surface 152a even when the stopper 51c collides against the protrusion, so that the ultimate collision can be limited to the abutment section 52b of the second member 152. With the abutment section 52b being provided with the rubber plate 80, the impact occurring at the time of collision with the stopper 51c can be alleviated.

Furthermore, the length of the rod 120 is set equal to the length of the housing 10 in the direction of the center axis OL1. Thus, even in a state where the rod 120 is maximally retracted into the housing 10, as shown in FIG. 8, the second member 152 can be disposed in an accommodated state within the housing 10. In this state, if the second member 152 is permitted to protrude outward from the housing 10 and rearward of the rear end plate 13, the length of the rod 120 may be further increased.

Figure 10:
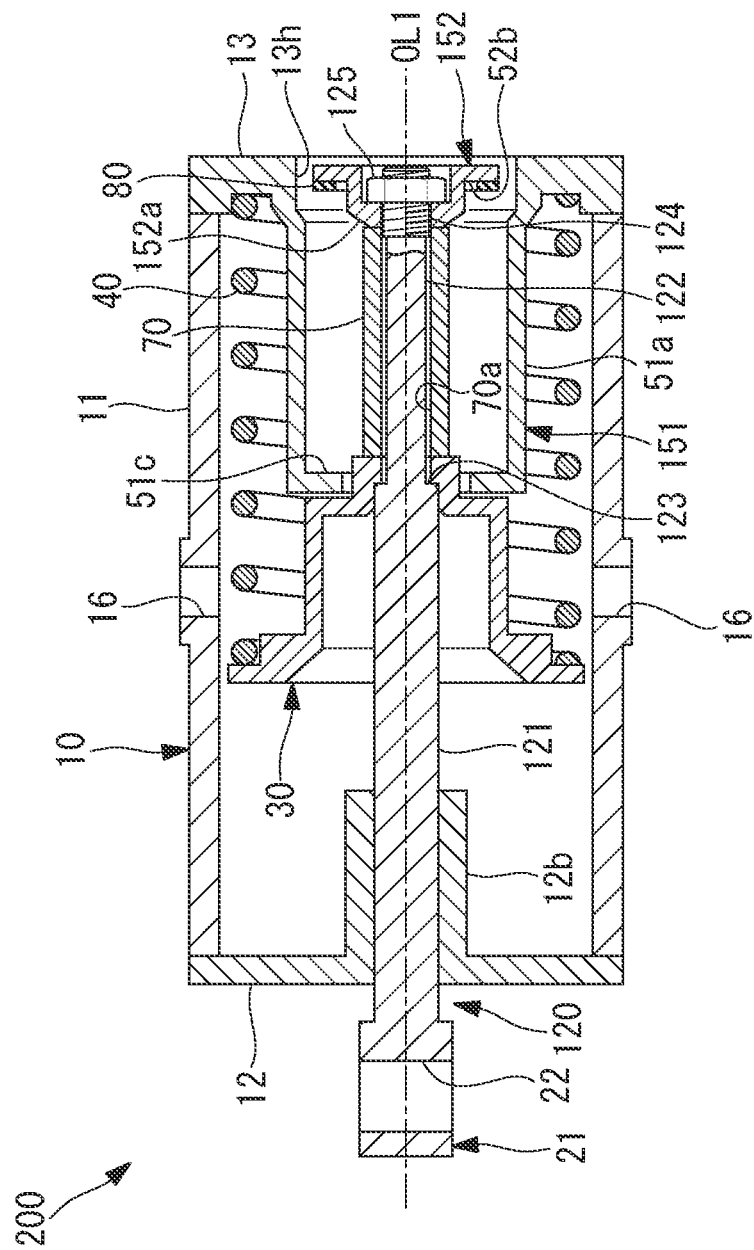
FIG. 10 is a vertical sectional view illustrating a first modification of the balancer device shown in FIG. 8.

As an alternative to this embodiment in which the rear end plate 13 and the first member 151 are manufactured as separate components and are assembled together by using bolts (not shown), the rear end plate 13 and the first member 151 may be integrated with each other, as shown in FIG. 10.

In this embodiment, assuming that the rod 120, the first member 151, and the second member 152 are composed of materials having similar tensile strengths, the rod 120, the first member 151, and the second member 152 are given shapes such that the cross-sectional area of the small-diameter section 122 is smaller than the minimum cross-sectional areas of the first member 151 and the second member 152. Alternatively, this relationship does not have to be satisfied if the first member 151 and the second member 152 are each composed of a material with a tensile strength higher than that of the rod 120.

Figure 11:
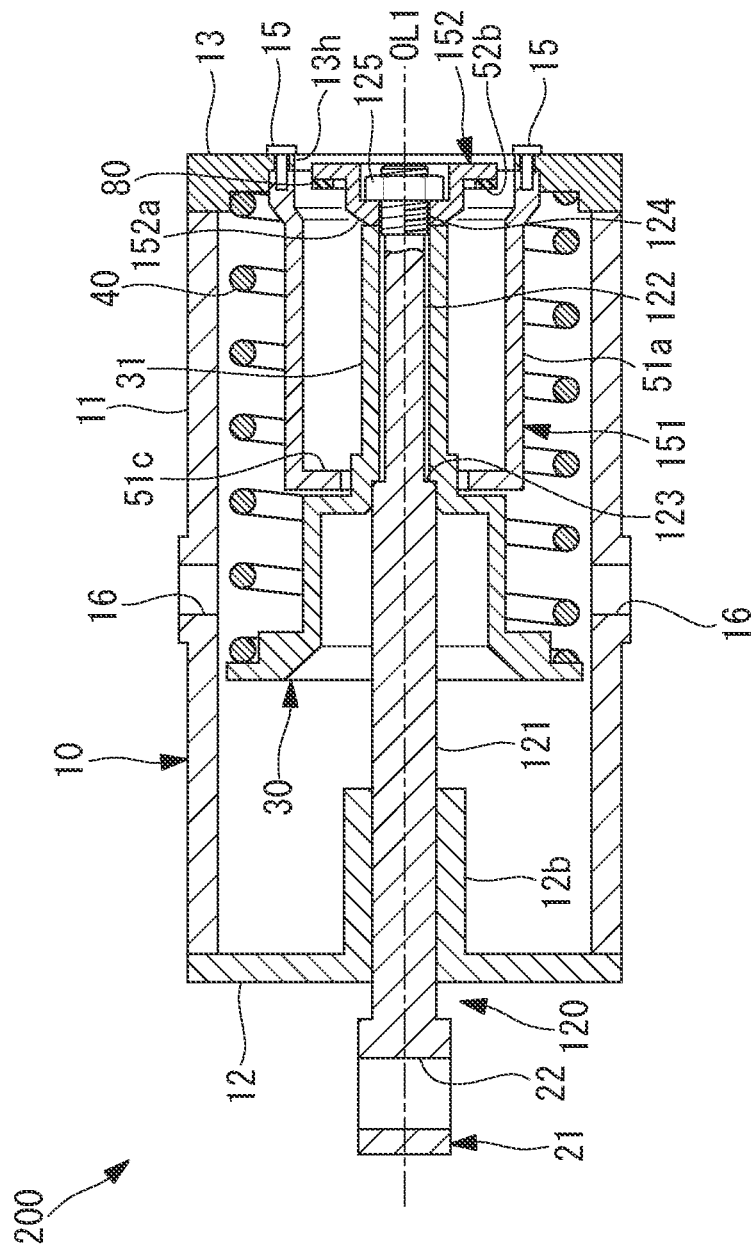
FIG. 11 is a vertical sectional view illustrating a second modification of the balancer device shown in FIG. 8.

As an alternative to this embodiment in which the spacer 70 is interposed between the movable member 30 and the second member 152, the movable member 30 may be integrally provided with a tubular section 31 in place of the spacer 70, as shown in FIG. 11. Accordingly, the second member 152 can be made compact, thereby achieving cost reduction.

Figure 12:
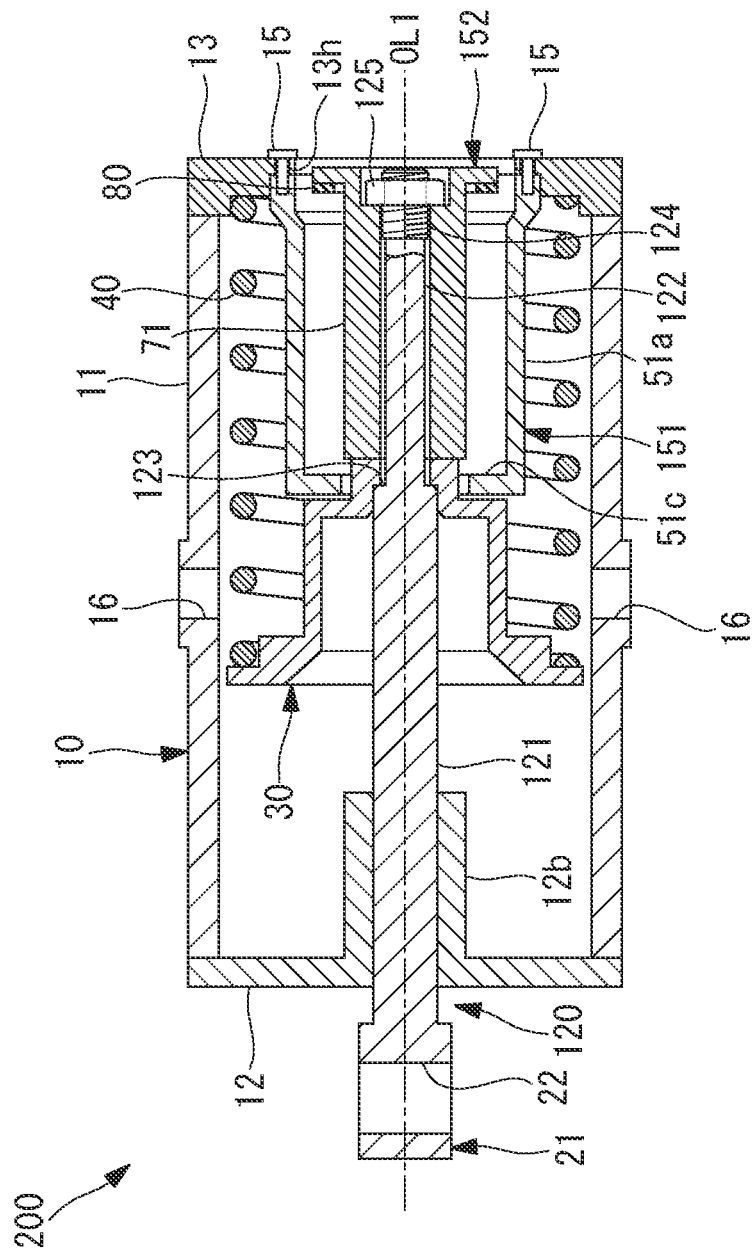
FIG. 12 is a vertical sectional view illustrating a third modification of the balancer device shown in FIG. 8.
Figure 13:
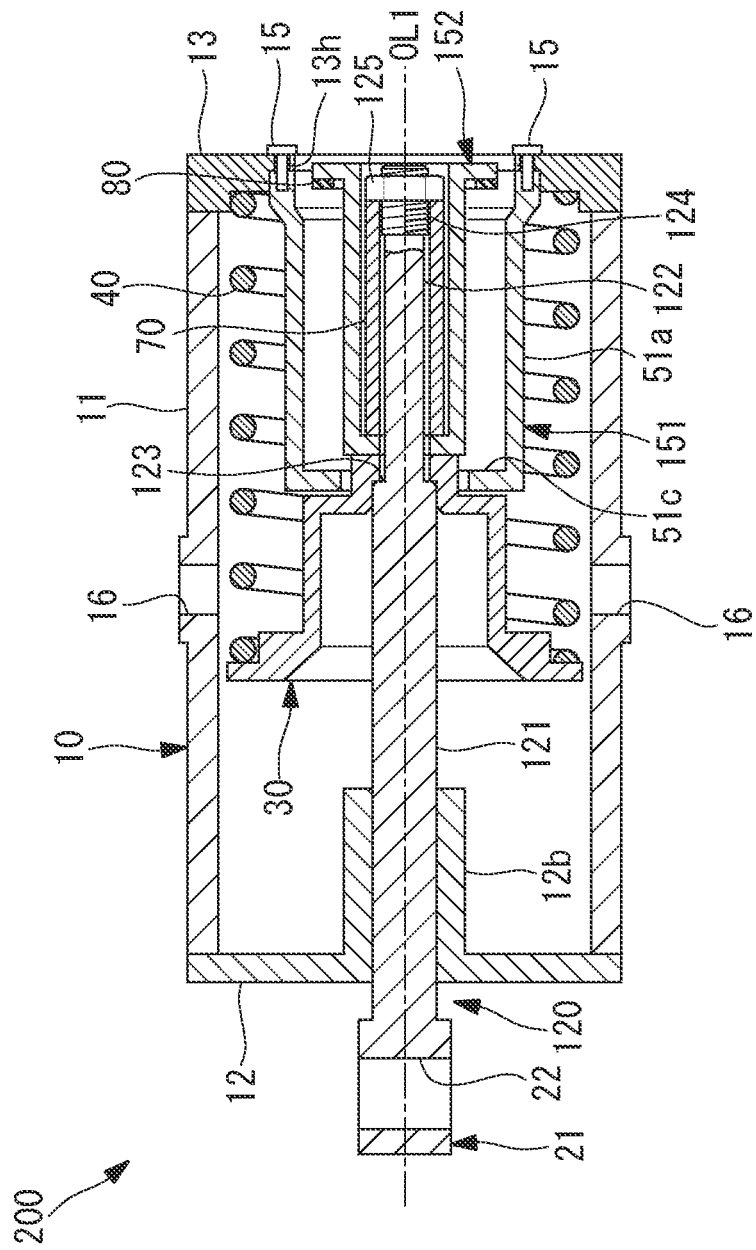
FIG. 13 is a vertical sectional view illustrating a fourth modification of the balancer device shown in FIG. 8.

Furthermore, as shown in FIG. 12, the second member may be integrally provided with a tubular section 71 in place of the spacer 70. Moreover, as shown in FIG. 13, the spacer 70 interposed between the movable member 30 and the second member 152 may alternatively be interposed between the second member 152 and the nut 125.

As an alternative to this embodiment in which the small-diameter section 122 of the rod 120 serves as a shock-absorbing section that deforms in accordance with an impact, the shock-absorbing section may be provided in the first member 151 or the second member 152. As another alternative, at least two of the rod 120, the first member 151, and the second member 152 may be provided with shock-absorbing sections.

As an alternative to the above example where the male threaded section 124 is provided at the distal end of the rod 120 and the nut 125 serves as a fastening member fastened to the male threaded section 124, the distal end of the rod 120 may be provided with a female thread, and a bolt may be employed as the fastening member.

The invention claimed is:

1. A balancer device comprising:
   a housing including a tubular body section and also including a front end plate and a rear end plate that block opposite ends of the body section in an axial direction;
   a rod that extends through the front end plate in a thickness direction thereof and that is supported such as to be movable in the axial direction;
   a movable member that is fixed to the rod and that is accommodated within the housing;
   a compression coil spring that is disposed between the movable member and the rear end plate; and
   a coupling member that couples the rod and the rear end plate to each other with play that is larger than a stroke of the rod in the axial direction,
   wherein the coupling member includes a first member fixed to the rear end plate and a second member fixed to the rod, and
   wherein the second member includes an abutment surface that abuts onto the first member from the rear end plate at a point in time when the play is lost.

2. The balancer device according to Claim 1,
wherein the first member includes a main body extending in the axial direction from the rear end plate toward the front end plate, and also includes a stopper that is provided at a distal end, located toward the front end plate, of the main body and onto which the abutment surface abuts.

3. The balancer device according to claim 2,
wherein the main body has a shape of a tube with an inner hole,
wherein the second member is disposed in a state where a distal end thereof located toward the rear end plate is accommodated within the inner hole, and
wherein the stopper extends in a flanged-like manner in a direction orthogonal to the axial direction from an inner peripheral surface of the distal end of the main body.

4. The balancer device according to Claim 1,
wherein at least one of the rod, the first member, and the second member is provided with a shock-absorbing section that absorbs impact energy by deforming in the axial direction without breaking in accordance with an impact occurring when the abutment surface of the second member and the first member come into abutment with each other.

5. The balancer device according to claim 4,
wherein the shock-absorbing section is provided in the rod and has a cross-sectional area smaller than a minimum cross-sectional area of each of the first member and the second member.

6. The balancer device according to claim 5,
wherein the rod extends in the axial direction through the movable member and the second member, the rod including a step with which a surface, located toward the front end plate, of the movable member is brought into abutment and a threaded section that is provided at an end located toward the rear end plate and to which a fastening member is fastenable,
wherein the movable member and the second member are interposed, in the axial direction, between the fastening member fastened to the threaded section and the step so that the movable member and the second member are fixed to the rod, and
wherein the shock-absorbing section is disposed between the step and the threaded section.

7. The balancer device according to claim 6,
wherein the shock-absorbing section has a length equal to a length of the first member in the axial direction.

8. The balancer device according to claim 6,
wherein a tubular spacer provided with a through-hole through which the shock-absorbing section extends is interposed between the movable member and the second member or between the second member and the fastening member.

9. The balancer device according to claim 8,
wherein the second member includes a tapered surface whose side located toward the front end plate tapers outward relative to the spacer.

10. The balancer device according to Claim 1,
wherein a damper is fixed to at least one of the abutment surface of the second member and a surface of the first member that faces the abutment surface in the axial direction.

11. A balancer device comprising:
a housing including a tubular body section and also including a front end plate and a rear end plate that block opposite ends of the body section in an axial direction;
a rod that extends through the front end plate in a thickness direction thereof and that is supported such as to be movable in the axial direction;
a movable member that is fixed to the rod and that is accommodated within the housing;
a compression coil spring that is disposed between the movable member and the rear end plate; and
a coupling member that couples the rod and the rear end plate to each other with play that is larger than a stroke of the rod in the axial direction,
wherein the coupling member is a flexible wiring member one end of which is fixed to the movable member and another end of which is fixed to the rear end plate in a state where the wiring member extends loosely.

* * * * *